Patented Mar. 25, 1941

2,235,938

UNITED STATES PATENT OFFICE 2,235,938

METHOD OF PRODUCING REACTION PRODUCTS OF AMMONIA AND ALDOSE SUGARS

Eugene J. Lorand, Wilmington, Del., assignor to Hercules Powder Company, Wilmington, Del., a corporation of Delaware No Drawing. Application October 15, 1938, Serial No. 235,281

11 Claims. (Cl. 260—211)

This invention relates to an improved method of producing reaction products of ammonia and aldoses.

It is well known in the art that an aldose sugar, such as, for example, glucose, reacts with ammonia to give crystalline reaction products. These reaction products have been referred to as glucose ammonia, the aldehyde-ammonia of glucose, or as glucosimine, the condensation product formed with elimination of water.

The reaction of aldose sugars with ammonia as carried out according to procedures known to the art has either involved contacting the reactants at room temperature for long periods of time or heating at elevated temperatures, for example, 100° C. or higher, for comparatively shorter periods. A disadvantage of the prior art procedures involving heating at elevated temperatures such as 100° C. or higher, has been the decomposition and degradation occurring at the elevated temperatures. The prior art procedures carried out at room temperature are too impractical to be inducive to commercial utilization.

According to my improved procedure the aldose sugar is heated in a substantially anhydrous condition with ammonia at a temperature within the range of about 50° C. to about 90° C. and preferably within the range of about 60° C. to 75° C. By carrying out the reaction within this temperature range, I am able to prepare reaction products of aldose sugars and ammonia in much higher yields than heretofore possible and by procedures which are readily adaptable to economical commercial utilization.

The aldose sugars which I preferably utilize in the production of aldose-ammonia reaction products in accordance with this invention are those aldose sugars which contain five or more carbon atoms. Thus, for example, I may use aldopentoses such as xylose or arabinose; aldohexoses, such as, glucose, mannose or galactose; dihexose saccharides having a functional aldehyde group, such as, lactose or maltose, etc.

The reaction of the aldose sugar with ammonia in accordance with this invention is carried out preferably with the use of anhydrous ingredients. The ammonia may be introduced in the form of liquid ammonia or as gaseous ammonia. The reaction may be carried out in the presence of anhydrous methyl alcohol as a solvent. With the use of the solvent the gaseous ammonia may desirably be passed into the cooled mixture of the aldose sugar and alcohol. Alternatively, liquid ammonia may be added to the mixture of the aldose sugar and alcohol. The reaction is preferably carried out under an ammonia pressure of at least 100 pounds per square inch.

In carrying out my improved method of producing reaction products of aldose sugars containing at least five carbon atoms and ammonia, the aldose sugar in a substantially anhydrous condition is heated with anhydrous ammonia at a temperature within the range of about 50° C. to about 90° C., and preferably about 60° C. to about 75° C. The reaction is carried out preferably in a suitable pressure vessel such as an autoclave, so that it may proceed in the presence of an excess of ammonia under superatmospheric pressure. When the reaction is carried out in the presence of anhydrous methyl alcohol, it is desirable to have sufficient ammonia present to exert a vapor pressure of at least 100 pounds per square inch at the reaction temperature. The mixture may be cooled to a low temperature, such as, for example, about —40° C. and saturated with gaseous ammonia. Alternatively, liquid ammonia may be added to the cooled mixture. It is not necessary to cool the mixture, however, before introducing the ammonia since the liquid ammonia may be pumped into the autoclave under pressure.

The mother liquor resulting from the reaction after separation of the crystalline reaction product contains an additional amount of the reaction product in solution. The mother liquor may be concentrated, cooled, or treated in any desirable manner to recover additional reaction product. The mother liquor may be used over again as the solvent for a fresh lot of sugar, and this process repeated over and over again, thereby minimizing the loss of product in the mother liquor.

The following examples will serve to illustrate the various embodiments of my improved procedure for preparing reaction products of aldose sugars and ammonia.

*Example I*

One hundred and fifty parts by weight of anhydrous glucose were placed in a stainless steel autoclave. After cooling to below —40° C., 122 parts by weight of liquid ammonia were added. The autoclave was sealed and heated with simultaneous agitation to about 60° C. in about 1 hour. The temperature was maintained with agitation at about 58° C. to 60° C. for about 2 hours. The autoclave was then allowed to cool for about 1 hour and the ammonia pressure released. The reaction product obtained was a brown syrup.

The syrup was triturated with anhydrous ethyl alcohol, yielding 63 parts by weight of white crystalline glucose-ammonia reaction product having a nitrogen content of 5.8%. The theoretical nitrogen content of the aldehyde-ammonia of glucose is 7.1%.

*Example II*

Two hundred and fifty parts by weight of anhydrous glucose and 600 parts by weight of anhydrous methyl alcohol were placed in an autoclave. After cooling to about —40° C., ammonia gas was passed into the mixture for about 1 hour. The autoclave was then sealed and heated to about 72° C. in one hour and heating continued for about 3 hours at that temperature with simultaneous agitation. The pressure was about 150 to about 160 lbs. per square inch. The pressure was then released and the autoclave opened. The product was a clear amber solution from which white crystalline material separated on cooling. The crystalline material separated amounted to about 80 parts by weight, and had a nitrogen content of 7.6%. The theoretical nitrogen content of glucosimine is 7.8%.

*Example III*

Fifty parts by weight of lactose and 118 parts by weight of anhydrous methyl alcohol were placed in an autoclave and the autoclave cooled in a carbon dioxide-acetone mixture. After sufficiently cooled, 82 parts by weight of liquid ammonia were added and the autoclave then sealed and heated to about 80° C. After holding at that temperature for about 3¾ hours the autoclave was allowed to cool to room temperature, and the ammonia gas released. The reaction product, a reddish liquid containing some brownish crystals, was allowed to stand at a temperature of about 4° C. out of contact with moisture and the crystals separating filtered off from the mother liquor. The crystals were washed with cold methyl alcohol and dried in vacuum. The yield was 28.2 parts by weight of nearly white crystalline material having a nitrogen content of 3.8%. The theoretical nitrogen content of lactosimine is 4.1% and of lactose ammonia 3.9%.

*Example IV*

Fifty parts by weight of anhydrous xylose and 118.5 parts by weight of anhydrous methyl alcohol were placed in an autoclave and the autoclave cooled in a dry ice-acetone mixture. After it was cooled sufficiently, 82 parts by weight of liquid ammonia were added, the autoclave sealed and then heated to a temperature of about 65° C. After heating at a temperature within the range of about 65° C. to 75° C. for about 5 hours, the autoclave was cooled and the ammonia gas released. The reaction product was a brownish solution containing a yellow crystalline material. After standing for about 3 days at a temperature of about 4° C. out of contact with moisture, the crystals were filtered off from the mother liquor, washed with cold methyl alcohol and dried in vacuum. The yield was 25.0 parts by weight of a white crystalline material having a nitrogen content of 9.2%. The theoretical nitrogen content of xylosimine is 9.3%.

It will be appreciated that the details set forth in the above description and examples are included for purposes of illustrating my invention and are to be construed as limiting the broad features of the invention only within the limitations of the claims attached.

What I claim and desire to protect by Letters Patent is:

1. The method of producing a crystalline reaction product of an aldose sugar containing at least 5 carbon atoms and ammonia which consists in contacting the aldose sugar in a substantially anhydrous condition with an excess of anhydrous ammonia under a pressure of at least about 100 pounds per square inch at a temperature within the range of about 50° C. to about 90° C., and recovering a crystalline reaction product from the reaction mixture.

2. The method of producing a crystalline reaction product of an aldopentose and ammonia which consists in contacting the aldopentose in a substantially anhydrous condition with an excess of anhydrous ammonia under a pressure of at least about 100 pounds per square inch at a temperature within the range of about 50° C. to about 90° C., and recovering a crystalline reaction product from the reaction mixture.

3. The method of producing a crystalline reaction product of an aldohexose and ammonia which consists in contacting the aldohexose in a substantially anhydrous condition with an excess of anhydrous ammonia under a pressure of at least about 100 pounds per square inch at a temperature within the range of about 50° C. to about 90° C., and recovering a crystalline reaction product from the reaction mixture.

4. The method of producing a crystalline reaction product of a dihexose saccharide having a functional aldehyde group and ammonia which consists in contacting the dihexose saccharide in a substantially anhydrous condition with an excess of anhydrous ammonia under a pressure of at least about 100 pounds per square inch at a temperature within the range of about 50° C. to about 90° C., and recovering a crystalline reaction product from the reaction mixture.

5. The method of producing a crystalline reaction product of xylose and ammonia which consists in contacting xylose in a substantially anhydrous condition with an excess of anhydrous ammonia under a pressure of at least about 100 pounds per square inch at a temperature within the range of about 50° C. to about 90° C., and recovering a crystalline reaction product from the reaction mixture.

6. The method of producing a crystalline reaction product of glucose and ammonia which consists in contacting glucose in a substantially anhydrous condition with an excess of anhydrous ammonia under a pressure of at least about 100 pounds per square inch at a temperature within the range of about 50° C. to about 90° C., and recovering a crystalline reaction product from the reaction mixture.

7. The method of producing a crystalline reaction product of lactose and ammonia which consists in contacting lactose in a substantially anhydrous condition with an excess of anhydrous ammonia under a pressure of at least about 100 pounds per square inch at a temperature within the range of about 50° C. to about 90° C., and recovering a crystalline reaction product from the reaction mixture.

8. The method of producing a crystalline reaction product of an aldose sugar containing at least five carbon atoms and ammonia which consists in contacting the aldose sugar in a substantially anhydrous condition with an excess of anhydrous ammonia in a reaction medium consisting of methyl alcohol under a pressure of at least about 100 pounds per square inch at a temperature within the range of about 50° C. to about 90° C., and recovering a crystalline reaction product from the reaction mixture.

9. The method of producing a crystalline reaction product of an aldopentose and ammonia which consists in contacting the aldopentose in a substantially anhydrous condition with an excess of anhydrous ammonia in a reaction medium consisting of methyl alcohol under a pressure of at least about 100 pounds per square inch at a temperature within the range of about 50° C. to about 90° C., and recovering a crystalline reaction product from the reaction mixture.

10. The method of producing a crystalline reaction product of an aldohexose and ammonia which consists in contacting the aldohexose in a substantially anhydrous condition with an excess of anhydrous ammonia in a reaction medium consisting of methyl alcohol under a pressure of at least about 100 pounds per square inch at a temperature within the range of about 50° C. to about 90° C., and recovering a crystalline reaction product from the reaction mixture.

11. The method of producing a crystalline reaction product of a dihexose saccharide having a functional aldehyde group and ammonia which consists in contacting the dihexose saccharide in a substantially anhydrous condition with an excess of anhydrous ammonia in a reaction medium consisting of methyl alcohol under a pressure of at least 100 pounds per square inch at a temperature within the range of about 50° C. to about 90° C., and recovering a crystalline reaction product from the reaction mixture.

EUGENE J. LORAND.